United States Patent

[11] 3,629,086

[72] Inventors: George E. F. Brewer, Novi; Robert A. Swider, Livonia, both of Mich.
[21] Appl. No.: 884,445
[22] Filed: Dec. 12, 1969
[45] Patented: Dec. 21, 1971
[73] Assignee: Ford Motor Company, Dearborn, Mich.
Continuation-in-part of application Ser. No. 825,589, May 19, 1969. This application Dec. 12, 1969, Ser. No. 884,445

[54] ANODIC DEPOSITION OF CERAMIC FRIT WITH CATIONIC ENVELOPE
1 Claim, 1 Drawing Fig.

[52] U.S. Cl. .................................................. 204/181
[51] Int. Cl. ................................................... B01k 5/02, C23b 13/00
[50] Field of Search ...................................... 204/181

[56] References Cited
UNITED STATES PATENTS
| | | | |
|---|---|---|---|
| 3,304,250 | 2/1967 | Gilchrist | 204/181 |
| 3,450,655 | 6/1969 | Spiller | 204/181 |
| 3,484,357 | 12/1969 | Plankenhorn | 204/181 |

Primary Examiner—Howard S. Williams
Attorneys—John R. Faulkner and Olin B. Johnson ABSTRACT: An improved method is provided for electrodepositing particulate ceramic frit upon an electrically conductive substrate which comprises enveloping the frit particles with a cationic resin, forming an aqueous dispersion of the thus coated frit and an anionic binder resin, and anodically depositing the coated frit and the anionic binder resin upon the substrate. The coated substrate can then be fired to volatilize and drive off all resinous material and convert the electrodeposited frit particles to a continuous film.

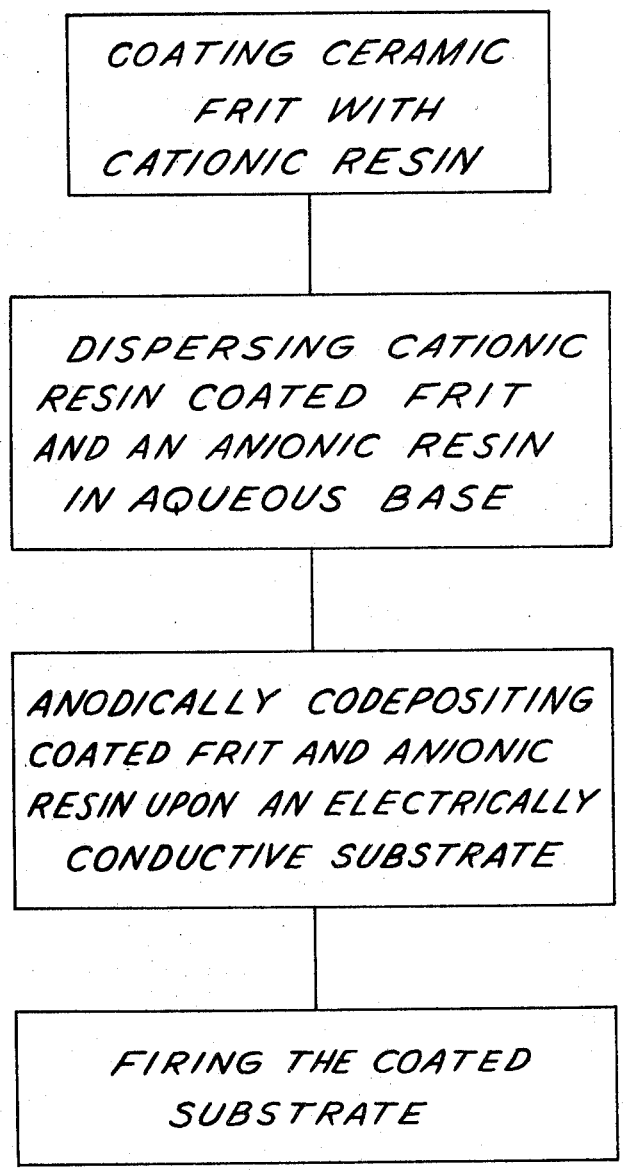

ANODIC DEPOSITION OF CERAMIC FRIT WITH CATIONIC ENVELOPE

This application is a continuation-in-part of our copending U.S. Pat. application Ser. No. 825,589 filed May 19, 1969.

BACKGROUND OF THE INVENTION

Anodic deposition of particulate material with an anodically depositable resin is well known to the art from the many publications relating to the electrodeposition of paint, e.g., U.S. Pat. No. 3,230,162, the teachings of which are incorporated herein by reference.

In our copending U.S. Pat. application Ser. No. 825,589, we disclose the electrodeposition of ceramic frit and state that many of these essentially uncharged particles impart alkalinity or acidity to the coating bath and thereby interfere with the maintenance of bath stability. One method suggested therein for preventing this was to encapsulate the frit particles in organic material and codepositing the coated frit with a codispersed binder resin.

THE INVENTION

In the electrodeposition of ceramic frit (glass or crystalline), from an aqueous bath onto an electrically conductive substrate, bath life can be substantially prolonged if the frit is first encapsulated with an envelope formed from a cationic resin and subsequently anodically codepositing the coated frit with an anionic resin.

DETAILED DESCRIPTION

The term "cationic resin" is used herein to refer to an organic resin having functional groups in its molecular structure which ionize in an aqueous acidic bath to form positive ionic sites thereon. When intimately dispersed in such a medium, such resins have affinity for the cathode of an electrodeposition cell.

The term "anionic resin" is used herein to refer to an organic resin having functional groups in its molecular structure which ionize in an aqueous basic bath to form negative ionic sites thereon. When intimately dispersed in such a medium, such resins have affinity for the anode of an electrodeposition cell.

The anionic resins used herein are synthetic polycarboxylic acid resin, i.e., organic resins having free or ionizable carboxyl groups in their molecular structure which are derived from a constituent monomer. Acidic film-forming resins include, but not by way of limitation, any of the polycarboxylic acid resins used in the electrodeposition of paint from an aqueous bath. They include coupled oils such as sunflower, safflower, perilla, hempseed, walnut seed, dehydrated castor oil, rapeseed, tomato seed, menhaden, corn, tung, soya, oiticia, or the like, the olefinic double bonds in the oil being conjugated or nonconjugated or a mixture, the coupling agent being an acyclic olefinic acid or anhydride, preferably maleic anhydride, but also crotonic acid, citraconic acid or anhydride, fumaric acid, or an acyclic olefinic aldehyde or ester of an acyclic olefinic ester such as acrolein, vinyl acetate, methyl maleate, etc., or even a polybasic acid such as phthalic or succinic, particularly coupled glyceride oils that are further reacted with about 2 to about 25 percent of a polymerizable vinyl monomer; maleinized unsaturated fatty acids; maleinized rosin acids, alkyd resins, e.g., the esterification products of a polyol with polybasic acid, particularly glyceride drying oil-extended alkyd resins; acidic hydrocarbon drying oil polymers such as those made from maleinized copolymers of butadiene and diisobutylene; diphenolic acid and like polymer resins; and acrylate-methyl methacrylate-methacrylic acid copolymers, acrylic acid and lower alkyl ($C_1$ to $C_4$) substituted acrylic acid-containing polymers, i.e., those having carboxyl groups contributed by alpha-beta unsaturated carboxylic acids or residues of these acids, etc. These and other suitable resins are described in detail in many patents of which the following are illustrative: U.S. Pat. Nos. 3,230,162; 3,335,103; 3,378,477 and 3,403,088.

These acidic resins are dispersed in an aqueous bath with the assistance of a water soluble base, e.g., water soluble amines, ammonia, potassium hydroxide, lithium hydroxide, etc., and with agitation anodic deposition in accordance with this invention is effected at an impressed electric potential (DC) in the range of about 50 to about 500 volts or higher.

The cationic film-forming resin may be a polymer having one or more primary, secondary or tertiary amine groups in its molecular structure.

Both the anionic and cationic film-forming materials must be materials that will vaporize during the firing cycle through which the particulate frit is converted to a continuous film without leaving carbonaceous deposit. This vaporization should take place at temperatures below about 1,500° F., preferably below 1,000° F.

The method of this invention will be more fully understood from the following illustrative examples:

EXAMPLE 1

Anodic deposition of particulate material is carried out with the materials and method hereinafter set forth:

1. Preparation Of The Cationic Resin Dispersion
   a. to 21.7 parts by weight of cationic acrylic resin (I) (as 70 percent nonvolatiles in butyl cellosolve) and 1.6 parts by weight of neutral epoxy resin diglycidyl ether of bisphenol A reacted with $C_{18}$ fatty acids—(50 percent nonvolatiles in xylol) are added 1.3 parts by weight glacial acetic acid and these materials are triturated.
   b. to the thoroughly mixed materials of
      a. are added 135 parts by weight deionized water and an intimate dispersion of the material of (a) is formed,
   c. the dispersion of (b) is diluted with about 625 parts by weight deionized water and about 250 grams of 400 mesh ceramic frit is added.
   (I) This resin is prepared from the following materials in the following manner:
      a. to a reaction vessel is charged 445 parts by weight of butyl cellosolve and the same is heated to 160° C.
      b. while maintaining the butyl cellosolve at reflux temperature of about 157° C. there is added dropwise over a 3 hour period a mixture of—

| Parts By Wt. | |
   |---|---|
   | 900 | styrene |
   | 375 | ethyl-hexyl acrylate |
   | 225 | tertiary butyl amine ethyl methacrylate |
   | 150 | butyl cellosolve |
   | 45 | tertiary butyl perbenzoate | c. after the addition of this mixture there is added over a 1 hour period 50 parts by weight butyl cellosolve and 15 parts by weight tertiary butyl perbenzoate.
   d. the reaction mix is held at reflux for 3 hours.
   e. the reaction mix is cooled and the resin recovered.
2. Formation Of The Frit Coating
   a. the dispersion of 1 (c) is agitated and to this dispersion is slowly added 1.46 parts by weight NaOH in about 540 parts by weight deionized water,
   b. the liquid is decanted, and
   c. the resultantly coated frit is washed with water and then with deionized water
3. Preparation Of The Coating Bath Of Coated Frit And Anionic Resin
   a. to 21.7 parts by weight of anionic acrylic resin (II) and 1.6 parts by weight neutral epoxy resin (diglycidyl ether of bisphenol A reacted with $C_{18}$ fatty acids—as 50 percent nonvolatiles in xylol) are added 0.7 parts by weight diethyl amine and these materials are triturated,
   b. to the thoroughly mixed materials of (a) are added 126 parts by weight deionized water and the mix agitated, c. to the bath formed in (b) are added the coated frit of 1 (c) and agitation of the bath is continued.

(II) This resin is prepared from the following materials in the following manner.

a. to a reaction vessel is charged 900 parts by weight butyl cellosolve and the same is heated to 140° C.

b. while maintaining this temperature, there is added dropwise over a 3.5 hour period a mixture of—

| Parts By Wt. | |
| --- | --- |
| 226 | methacrylic acid |
| 630 | 2-ethyl hexyl acrylate |
| 1,034 | styrene |
| 210 | hydroxy ethyl methacrylate |
| 21 | azobisiso-butyronitrile | c. after addition is complete, the temperature of 140° C. was held for 0.5 hour and the resin recovered. The resin has an acid value of about 71 and an X–Y Gardner-Holdt viscosity at 50 percent solids in butyl cellosolve.

4. Electrodeposition Of The Coated Frit

The dispersion of 3 (c) containing the dispersed coated frit and the dispersed anionic resin is employed as the coating bath of an electrodeposition cell and the coated frit is electrodeposited upon an electrically conductive workpiece, i.e., a steel panel serving as the anode (relatively positive electrode) of the electrodeposition cell. A difference of electrical potential of 200 volts is impressed between the anode and the cathode of the electrodeposition cell for 2 minutes. A deposit having an average depth of 50 mils (0.050 inch) is found on the anode. This same coating bath is maintained under agitation for about 100 hours and electrodeposition is again carried out under the same conditions. The deposit is again about 50 mils in 2 minutes at 200 volts indicating no evidence of bath deterioration.

EXAMPLE 2

Anodic deposition of particulate material is carried out with the materials and methods hereinafter set forth:

1. Preparation Of The Cationic Resin Dispersion
   a. to 5.7 parts by weight of cationic acrylic resin of example 1 (as 70 percent nonvolatiles in butyl cellosolve) is mixed with 0.67 parts by weight glacial acetic acid and 194.6 parts by weight of water are worked into this mix.
2. Formation Of The Frit Coating
   a. to the above mix are added about 70 parts by weight of 400 mesh ceramic frit under agitation.
   b. to the frit containing mix are slowly added 140 parts by weight of water containing 0.40 parts by weight diethylamine.
   c. the liquid is separated and the resultant coated frit comprising sediment is washed with water.
3. Preparation Of The Coating Bath Of Coated Frit And Anionic Resin
   a. to 5.7 parts by weight of the anionic acrylic resin of example 1 (as 70 percent nonvolatiles in butyl cellosolve) are mixed with 0.25 parts by weight diethylamine and admixed with agitation with 328 parts by weight water.
   b. to the dispersion of 3 (a) is added the coated frit of 2 (c) and the agitation of the bath is continued.
4. Electrodeposition Of The Coated Frit The dispersion of 3 (c) containing the dispersed coated frit and the dispersed anionic resin is employed as the coating bath of an electrodeposition cell and the coated frit and anionic resin are electrodeposited upon an electrically conductive workpiece, i.e., a steel panel serving as the anode (relatively positive electrode) of the electrodeposition cell. A difference of electrical potential of 200 volts is impressed between the anode and the cathode of the electrodeposition cell for 2 minutes. A deposit having an average depth of about 60 mils (0.060 inch) is found on the anode. This same coating bath is maintained under agitation for about 240 hours and electrodeposition is again carried out under the same conditions. The deposit is again about 60 mils in 2 minutes at 200 volts indicating no evidence of bath deterioration.

It will be understood by those skilled in the art that modification can be made in the foregoing illustrative examples within the spirit and scope of this invention as expressed in the appended claims.

We claim:

1. In a method for codepositing particulate ceramic frit and anionic organic resin from an aqueous dispersion thereof serving as coating bath of an electrodeposition cell onto an anode of said cell immersed in said coating bath by passing direct electric current through said bath between said anode and a cathode spaced apart from said anode and in contact with said coating bath, the improvement which comprises coating the frit particles with a cationic resin, intimately dispersing the thus coated frit particles with anion forming polycarboxylic acid resin and a water soluble base in said coating bath and electrodepositing said coated frit and said polycarboxylic acid resin upon said anode.

* * * * *